(12) United States Patent
Mergner et al.

(10) Patent No.: US 9,488,087 B2
(45) Date of Patent: Nov. 8, 2016

(54) COATING DEVICE AND METHOD

(75) Inventors: Bernd Mergner, Rheinfelden (DE); Wolfgang Hasselmann, Rheinfelden (DE); Dieter Detterbeck, Altenhasslau (DE); Sigurd Adler, Affalterbach (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 709 days.

(21) Appl. No.: 13/579,191

(22) PCT Filed: Feb. 15, 2011

(86) PCT No.: PCT/EP2011/052197
§ 371 (c)(1),
(2), (4) Date: Aug. 15, 2012

(87) PCT Pub. No.: WO2011/101337
PCT Pub. Date: Aug. 25, 2011

(65) Prior Publication Data
US 2012/0315381 A1 Dec. 13, 2012

(30) Foreign Application Priority Data

Feb. 19, 2010 (DE) ........................ 10 2010 008 700

(51) Int. Cl.
| | |
|---|---|
| *B05C 7/04* | (2006.01) |
| *B05C 13/02* | (2006.01) |
| *B05C 3/18* | (2006.01) |
| *B05B 13/06* | (2006.01) |
| *B05B 13/02* | (2006.01) |
| *B05D 7/22* | (2006.01) |
| *B05D 1/18* | (2006.01) |
| *B05D 1/36* | (2006.01) |
| *F01N 3/28* | (2006.01) |
| *B01J 37/02* | (2006.01) |

(Continued)

(52) U.S. Cl.
CPC .......... *F01N 3/2828* (2013.01); *B01J 37/0215* (2013.01); *B05C 3/02* (2013.01); *B05C 3/109* (2013.01); *B05C 3/20* (2013.01); *B05C 5/002* (2013.01); *B05C 5/02* (2013.01); *B05C 5/0225* (2013.01); *B05C 7/04* (2013.01); *B05C 13/02* (2013.01); *B05D 1/18* (2013.01); *B05D 7/22* (2013.01); *B05C 3/18* (2013.01); *G01F 23/265* (2013.01)

(58) Field of Classification Search
None
See application file for complete search history.

(56) References Cited

U.S. PATENT DOCUMENTS 2,341,501 A * 2/1944 Greenwell et al. ............. 138/26
3,553,575 A * 1/1971 Shea et al. .................. 73/304 C
(Continued)

FOREIGN PATENT DOCUMENTS

CN 201143430 * 11/2008
CN 201143430 Y 11/2008
(Continued)

OTHER PUBLICATIONS

Gillum, D.R., "Industrial Pressure, Level, and Density Measurement—Chapter 5: Level Measurement Theory and Visual Measurement Techniques", 2009, 2nd Ed., ISA, p. 245-296.*
(Continued)

*Primary Examiner* — Binu Thomas
(74) *Attorney, Agent, or Firm* — Smith, Gambrell & Russell, LLP

(57) ABSTRACT

The invention relates to a novel assembly for coating substrates.

16 Claims, 11 Drawing Sheets

Figure 1:
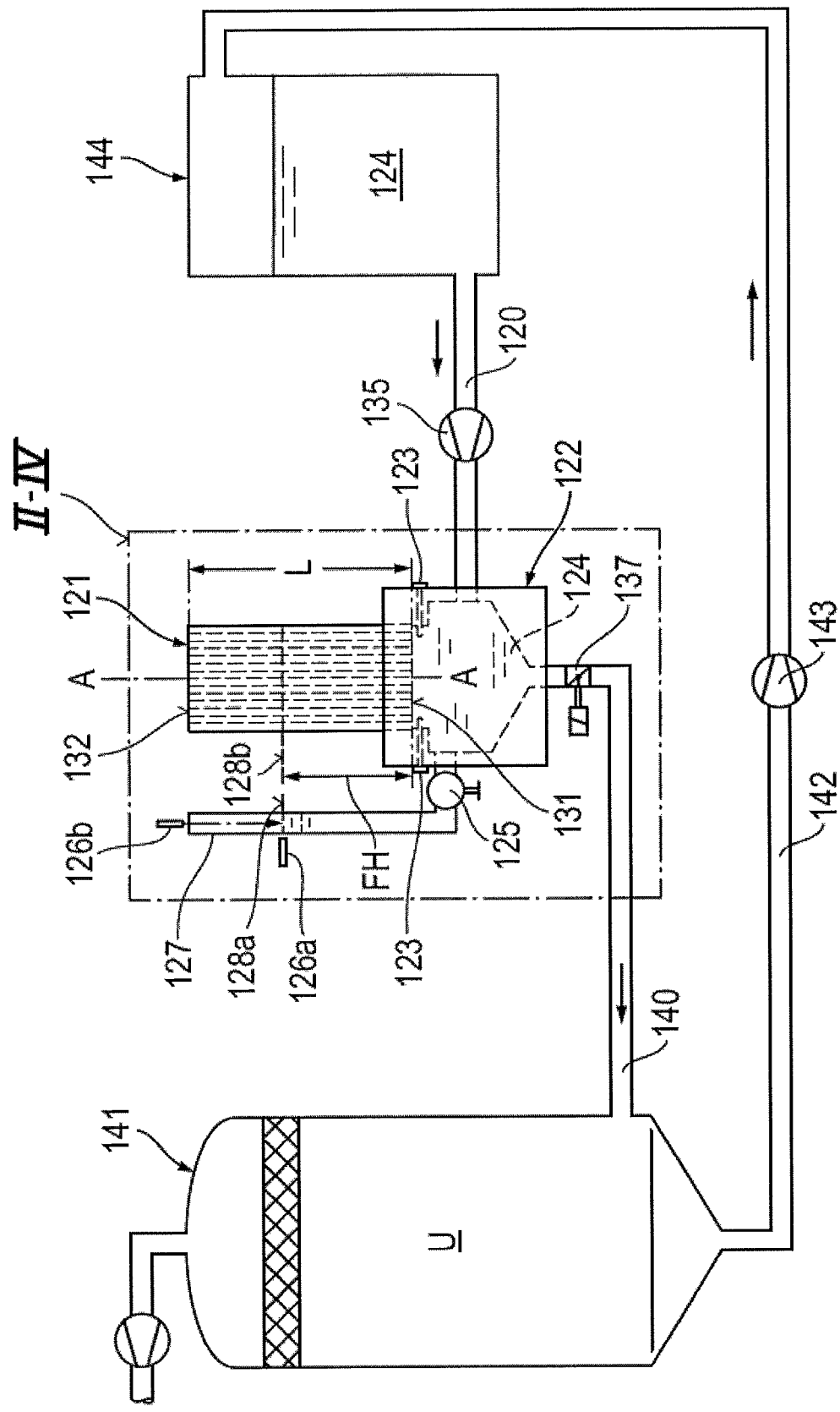

(51) Int. Cl.
  *B05C 3/02* (2006.01)
  *B05C 3/109* (2006.01)
  *B05C 3/20* (2006.01)
  *B05C 5/02* (2006.01)
  *B05C 5/00* (2006.01)
  *G01F 23/26* (2006.01)

(56) References Cited

U.S. PATENT DOCUMENTS

| | | | |
|---|---|---|---|
| 4,897,797 A * | 1/1990 | Free et al. | 700/266 |
| 6,149,973 A * | 11/2000 | Foerster et al. | 427/235 |
| 6,478,874 B1 | 11/2002 | Rosynsky et al. | |
| 6,548,105 B2 | 4/2003 | Kiessling et al. | |
| 6,627,257 B1 * | 9/2003 | Foerster et al. | 427/235 |
| 6,746,716 B2 | 6/2004 | Kiessling et al. | |
| 7,094,728 B2 | 8/2006 | Yan et al. | |
| 7,374,792 B2 | 5/2008 | Rosynsky et al. | |
| 2001/0024686 A1 * | 9/2001 | Kiessling | B01J 35/0006 427/235 |
| 2003/0044520 A1 * | 3/2003 | Kiessling et al. | 427/230 |
| 2004/0033306 A1 * | 2/2004 | Bouchier et al. | 118/429 |
| 2010/0051281 A1 * | 3/2010 | Shaw | 166/305.1 |

FOREIGN PATENT DOCUMENTS

| | | |
|---|---|---|
| EP | 0 941 763 A1 | 9/1999 |
| EP | 1 136 462 A1 | 9/2001 |
| EP | 1 273 344 A1 | 1/2003 |
| WO | 01/10573 A2 | 2/2001 |

OTHER PUBLICATIONS

International Search Report for PCT/EP2011/052197 mailed Apr. 19, 2011 (English translation attached).

* cited by examiner

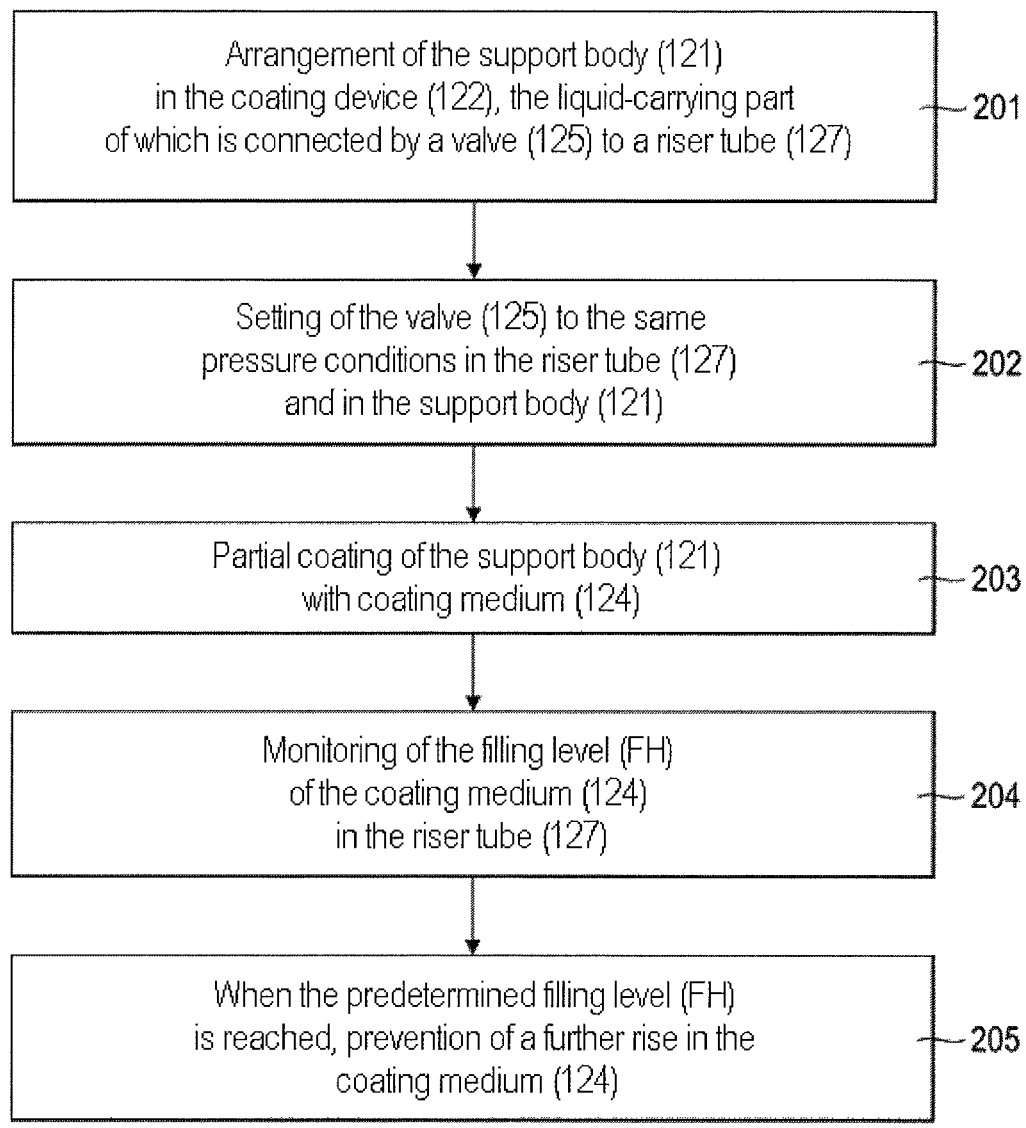

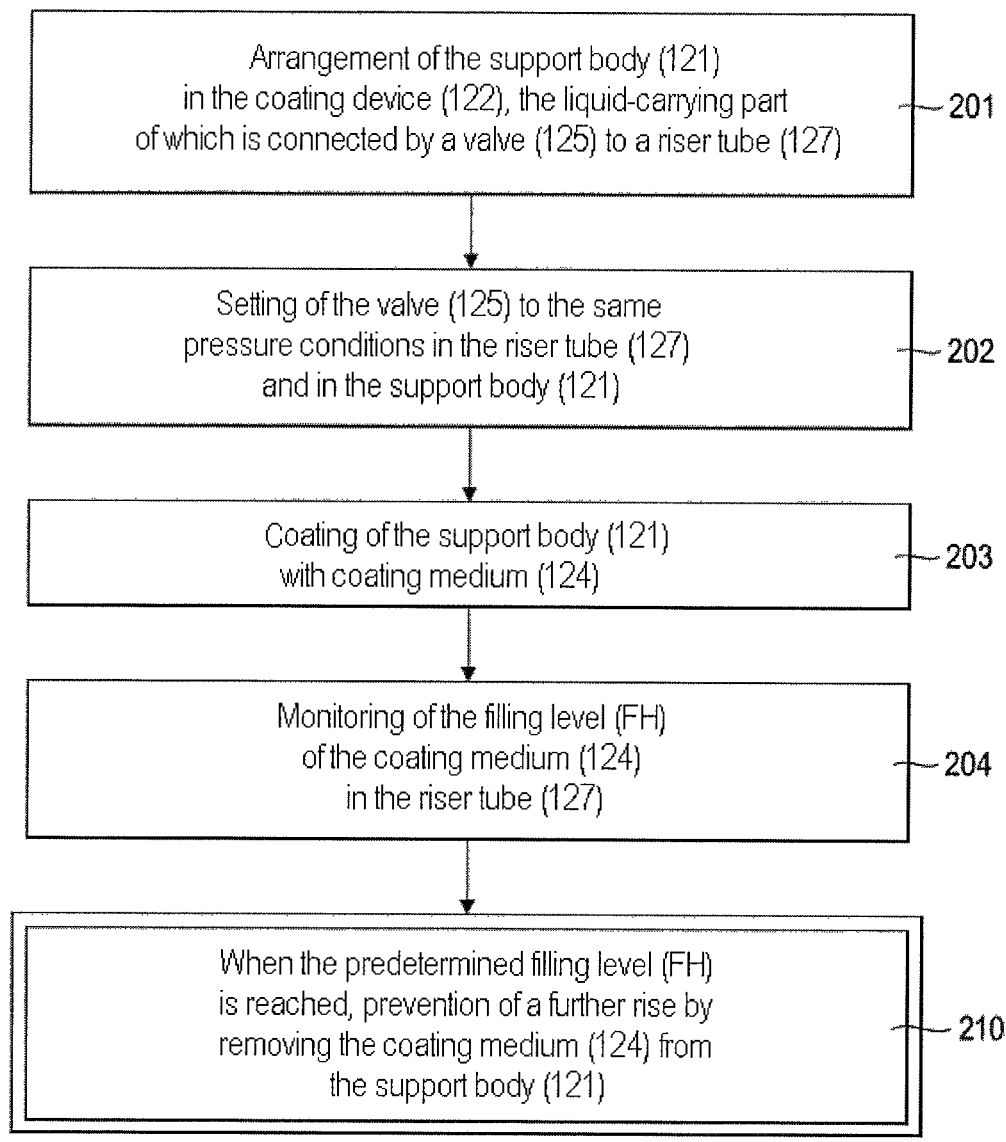

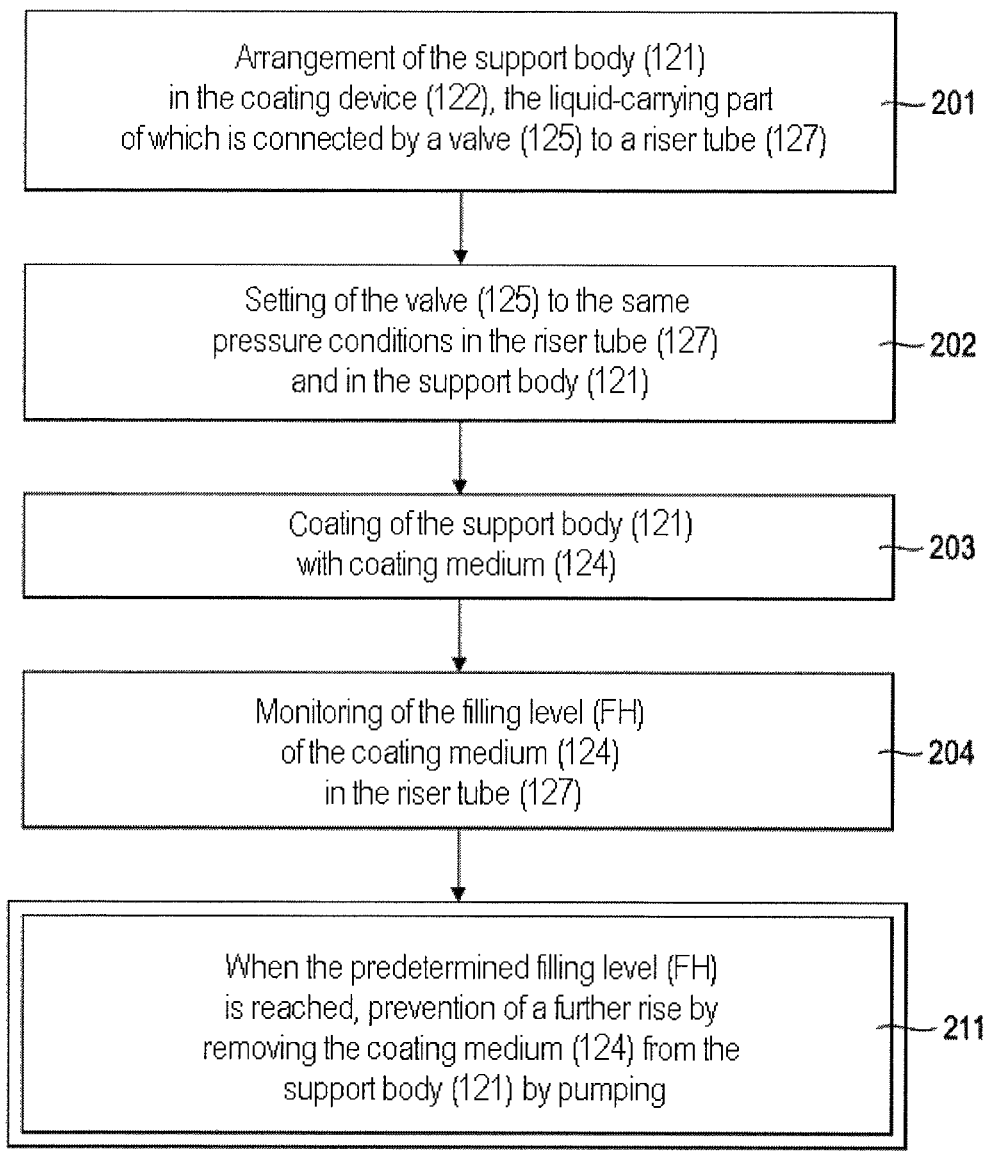

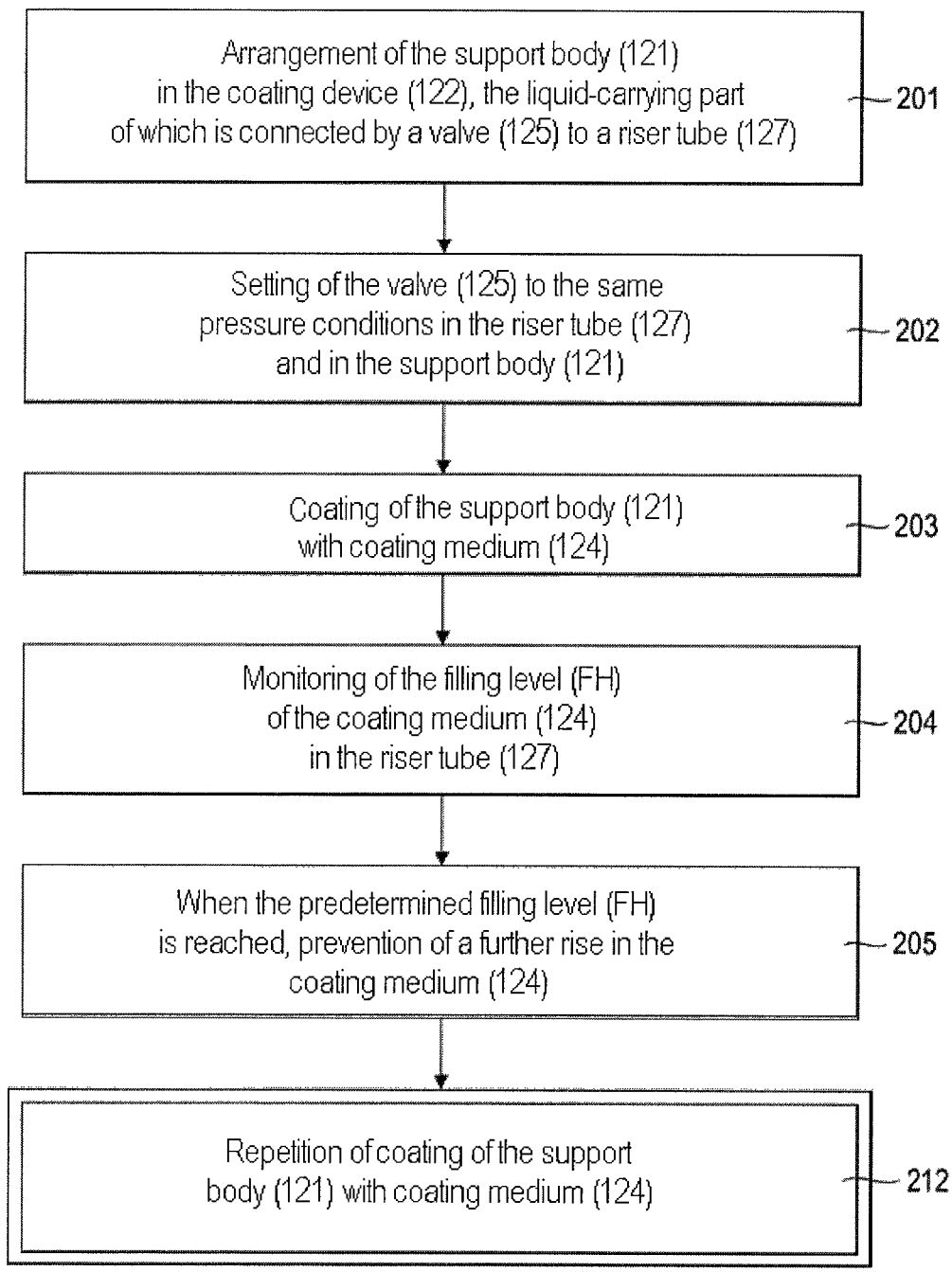

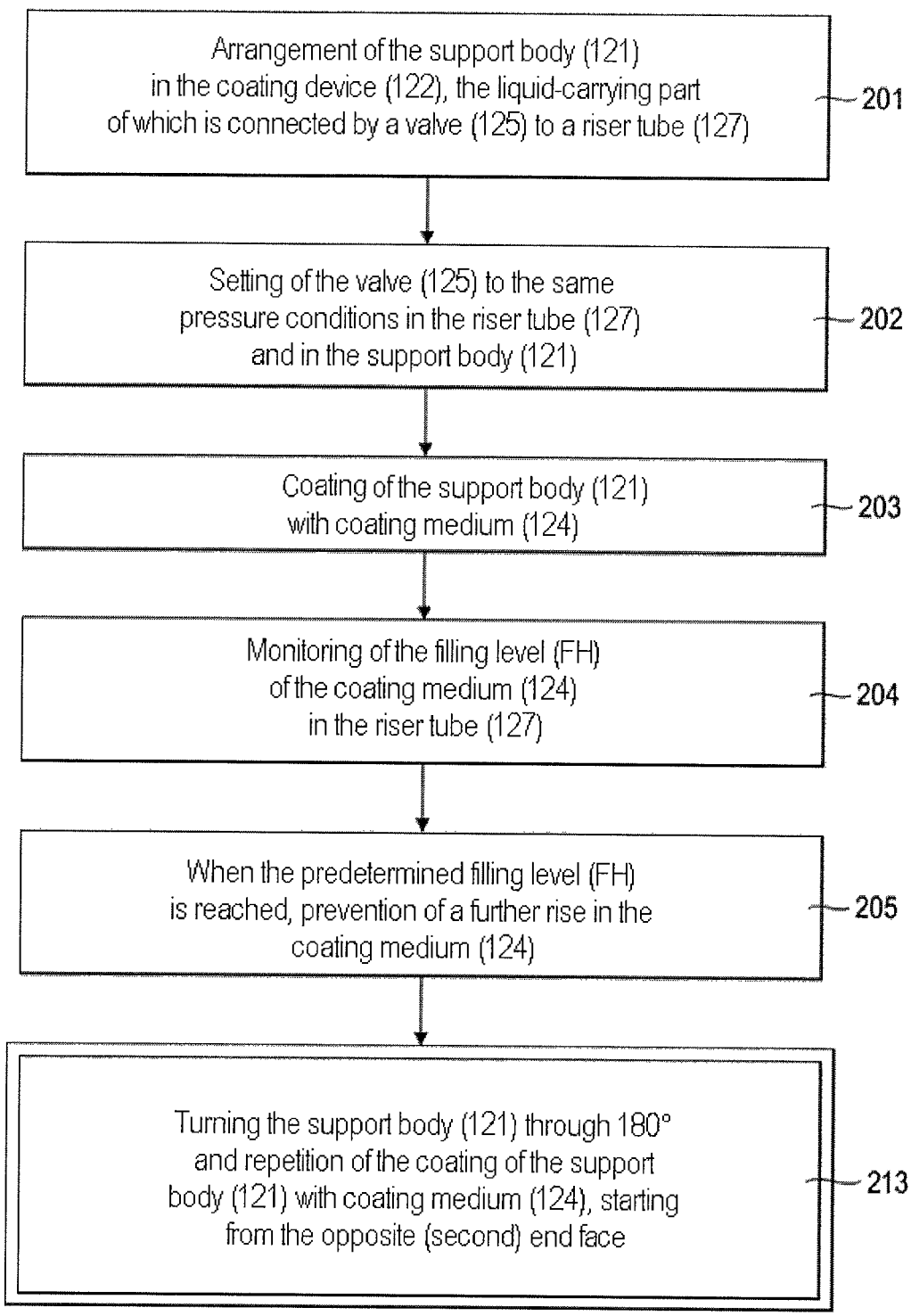

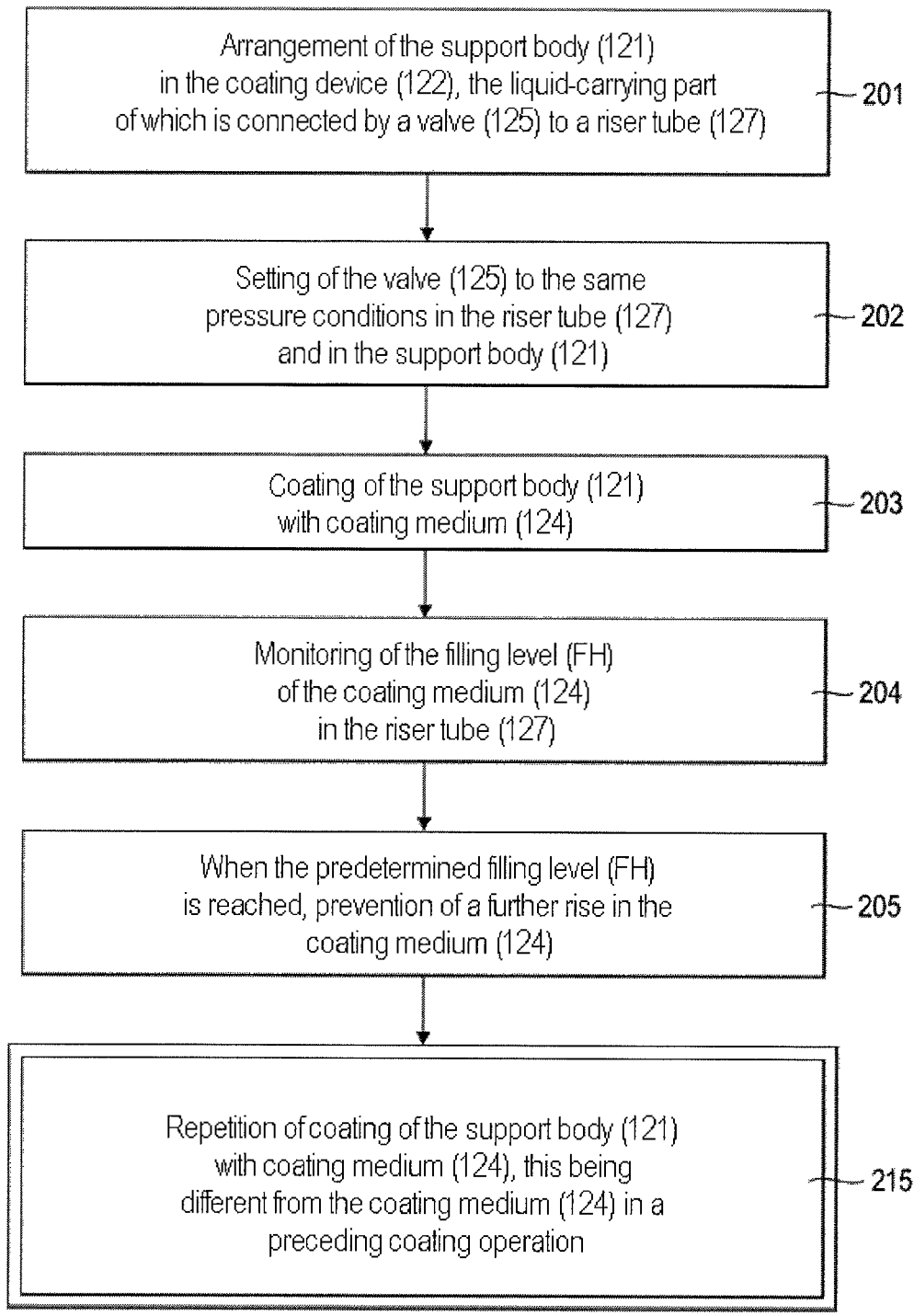

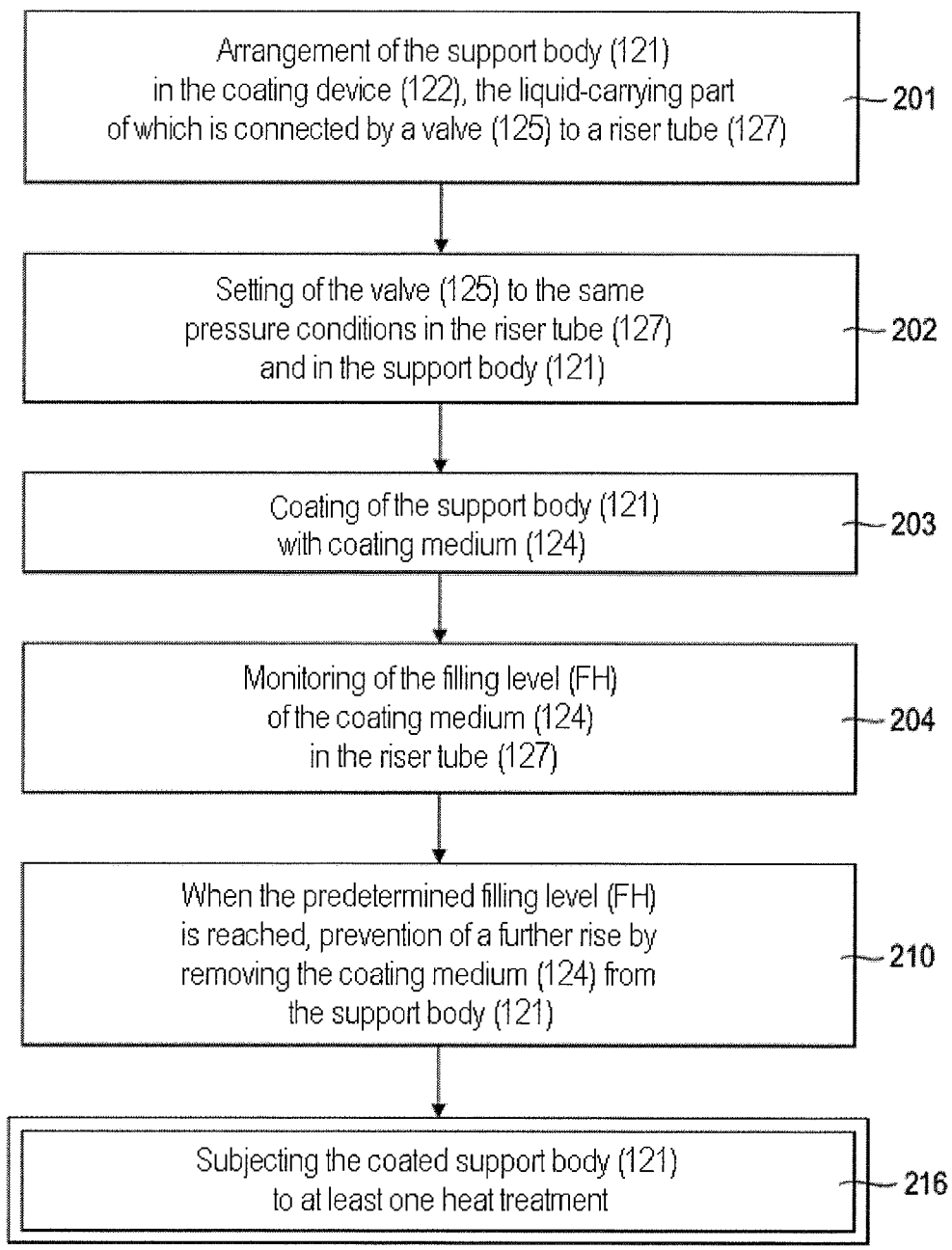

COATING DEVICE AND METHOD

Various problems arise during the coating of ceramic or metallic honeycomb bodies/filters, also referred to below as substrates, with liquid coating media.

One possibility for coating substrates is to bring the openings on one side thereof into contact with the coating medium made available and to draw the liquid coating medium through the channels of the substrate by applying a vacuum to the opposite side of the substrate. If the intention is to coat the channels over only part of the length thereof, it is disadvantageous that different channels are coated over different lengths due to the inevitable flow profile which arises.

If the coating medium is forced into the channels by pressure against the force of gravity, there is then a need to check when the liquid emerges at the top in the case of complete coating of the channels. In the case of coating over part of the length of the channels, the height of the liquid column of coating medium within the channels is determined by sensors. A method of this kind is described in EP-A1-1273344, for example.

However, this method does not work if the substrate is composed of conductive or semiconductive materials, such as metals or silicon carbide.

It was the object of the invention to provide a simple device for coating support bodies which allows the filling level of coating medium within the support body to be tracked easily, irrespective of the material thereof. The object is achieved by virtue of the fact that the liquid-carrying part of the coating device (122) is connected by a valve (125) to a riser tube (127), wherein the valve (125) ensures the same pressure conditions and hence substantially the same rise in the liquid in the riser tube (127) as in the support body, the riser tube (127) thus allowing the filling level of the coating medium (124) in the support body (121) to be monitored.

BRIEF DESCRIPTION OF THE INVENTION

Specific embodiments of the invention relate inter alia to:
1. An arrangement for completely or partially coating support bodies (121) with liquid coating medium (124), wherein the support bodies (121) each have a cylinder axis, two end faces, a circumferential surface and an axial length L and are traversed from the first end face to the second end face by a multiplicity of channels, and the support body (121) is coated with a desired quantity of the coating medium (124) by aligning the cylinder axis thereof vertically and introducing the coating medium (124) into the channels through at least one of the end faces of the support body, characterized
   in that the support body (121) is arranged on a coating device (122), the liquid-carrying part of which is connected by a valve (125) to a riser tube (127), wherein the valve (125) ensures the same pressure conditions and hence substantially the same rise in the liquid in the riser tube (127) as in the support body, the riser tube (127) thus allowing the filling level of the coating medium (124) in the support body (121) to be monitored.
2. The arrangement according to point 1, wherein the filling level is less than the axial length L of the support body.
3. The arrangement according to point 1 or 2, wherein monitoring of the filling level of the coating medium (124) in the support body (121) is effected by means of at least one sensor (126) on the riser tube (127).
4. The arrangement according to point 3, wherein the sensors are selected from the group comprising conductivity sensors, ultrasound sensors, photoelectric barriers and combinations thereof.
5. A method for completely or partially coating support bodies (121) with liquid coating medium (124), wherein the support bodies (121) each have a cylinder axis, two end faces, a circumferential surface and an axial length L and are traversed from the first end face to the second end face by a multiplicity of channels, wherein the support body (121) is arranged on a coating device (122), the liquid-carrying part of which is connected by a valve (125) to a riser tube (127),
   characterized in that
   the valve (125) is set to ensure the same pressure conditions and hence substantially the same rise in the liquid in the riser tube (127) as in the support body, the riser tube (127) thus allowing the filling level of the coating medium (124) in the support body (121) to be monitored,
   the support body (121) is coated with a desired quantity of the coating medium (124) by aligning the cylinder axis thereof vertically and introducing the coating medium (124) into the channels through at least one of the end faces of the support body;
   the rise in the filling level is monitored at the riser tube (127) and, when a desired filling level has been achieved, a further rise in the liquid is prevented.
6. The method according to point 5, wherein the further rise in the filling level is prevented by removing the coating medium (124) from the support body (121).
7. The method according to point 6, wherein removal is accomplished by pumping, extraction by suction or blowing out.
8. The method according to point 5, wherein the coating operation is repeated.
9. The method according to point 8, wherein the support body (121) is turned through 180° before the coating operation is repeated, and is then coated, with the result that coating starts from the opposite end face of the support body (121).
10. The method according to point 8 or 9, wherein the coating medium (124) when the coating operation is repeated is the same as or different from the coating medium in a preceding coating operation.
11. The method according to one of points 5 to 10, wherein the support body (121) is subjected to at least one heat treatment in a subsequent step.
12. The method according to point 11, wherein the support body (121) is dried before the heat treatment.
13. The method according to one of points 5 to 11, wherein the support body is wetted before being arranged on the coating device (122).
14. A method for producing exhaust systems containing coated support bodies (121), wherein at least one support body (121) is coated by a method of claims 5 to 12 and at least one support body (121) coated in this way is connected to the exhaust system.
15. The method according to point 14, wherein the exhaust system is an exhaust system of a motor vehicle.
16. The use of a device according to one of points 1 to 4 for producing coated support bodies for cleaning exhaust gases.

DETAILED DESCRIPTION OF THE INVENTION

The present invention relates to an arrangement for completely or partially coating support bodies (121) with liquid coating medium (124).

Illustrative embodiments are described in FIGS. 1 to 11, in which:

FIG. 1 shows a coating system consisting of a coating device (122), a tank (144) for the coating medium (124) and a vacuum reservoir (141), wherein a feed line (120), an outlet line (140) and a return line (142) containing a recirculation pump (143) for coating medium (124) are provided.

Figure 2:
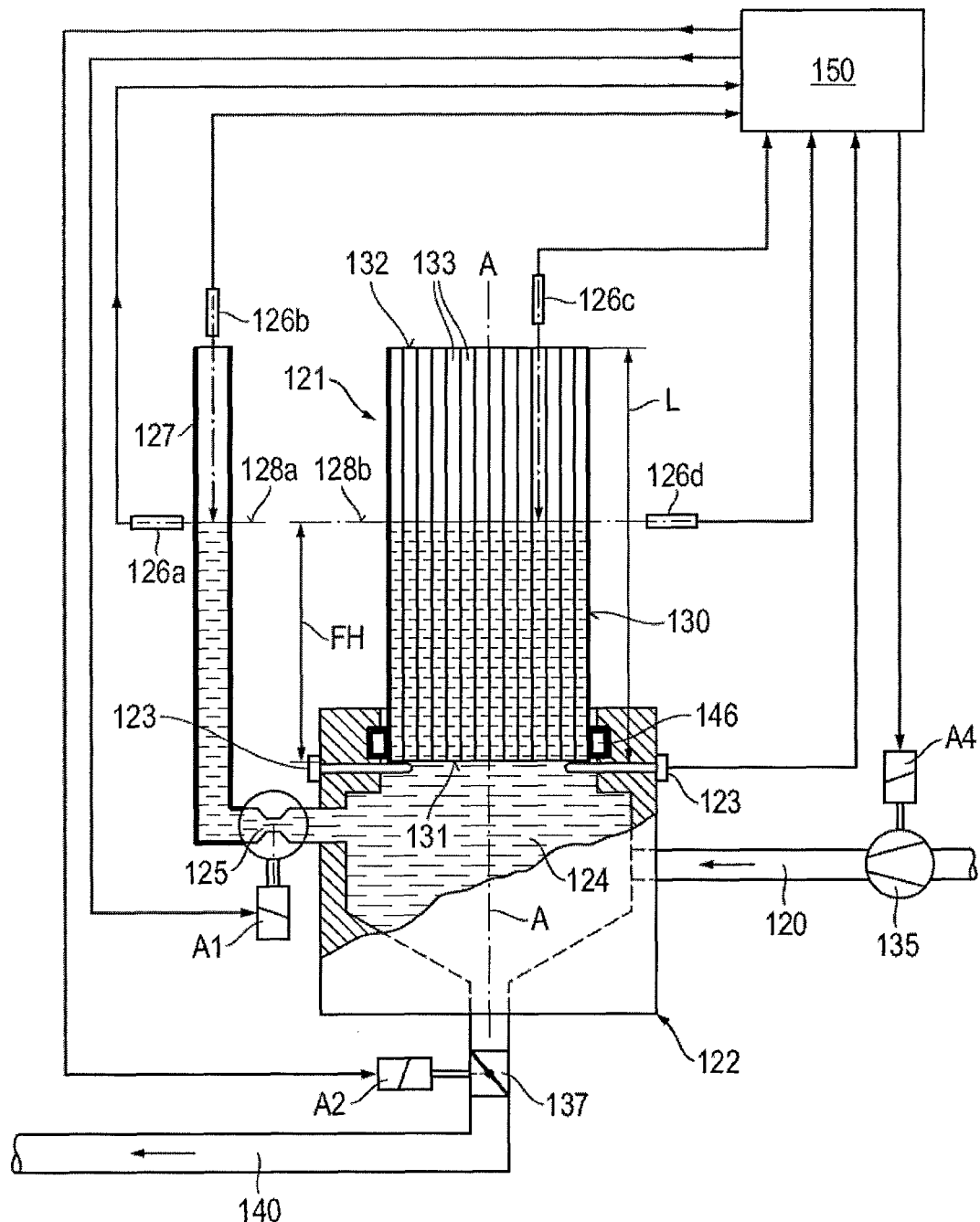
Figure 3:
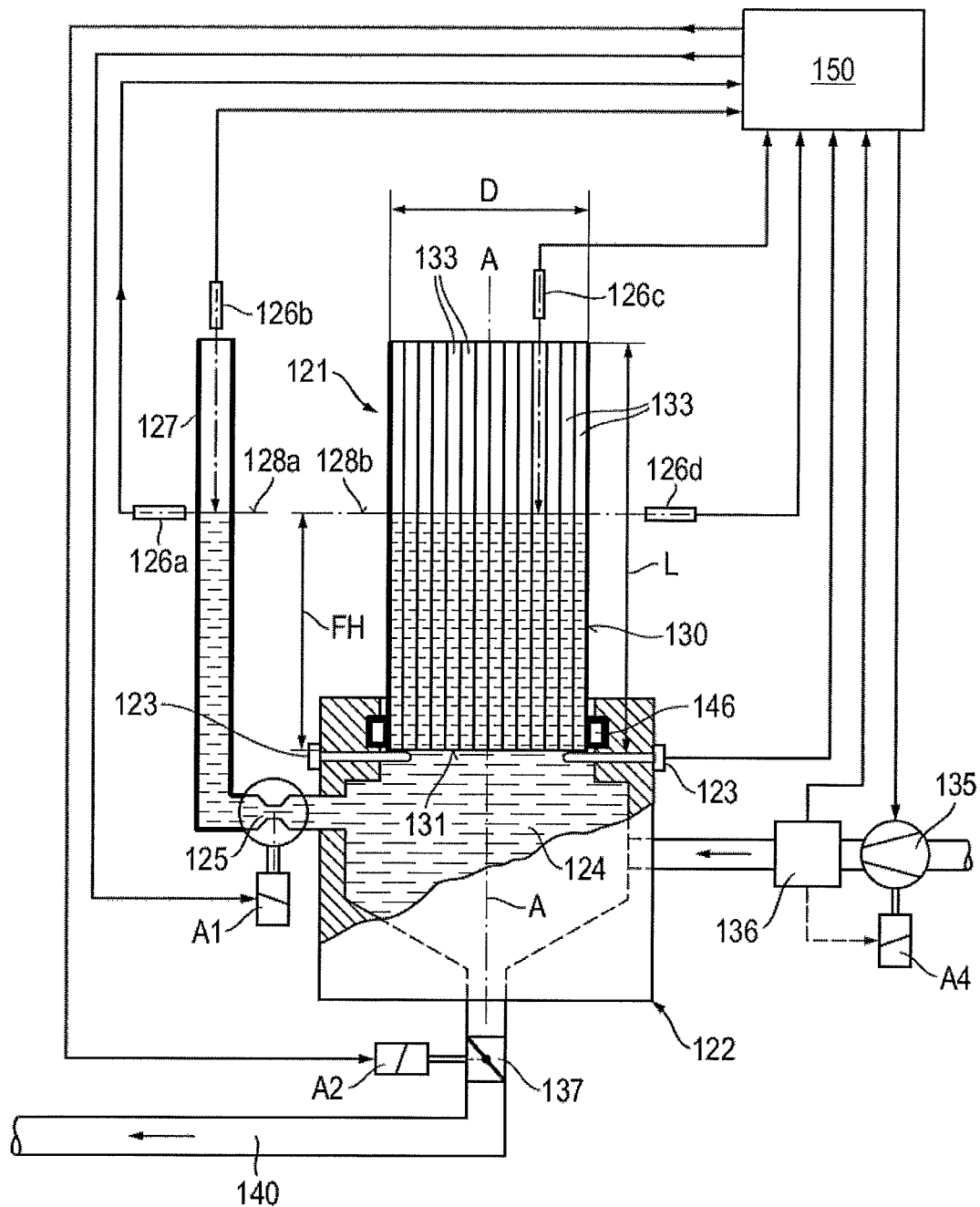
Figure 4:
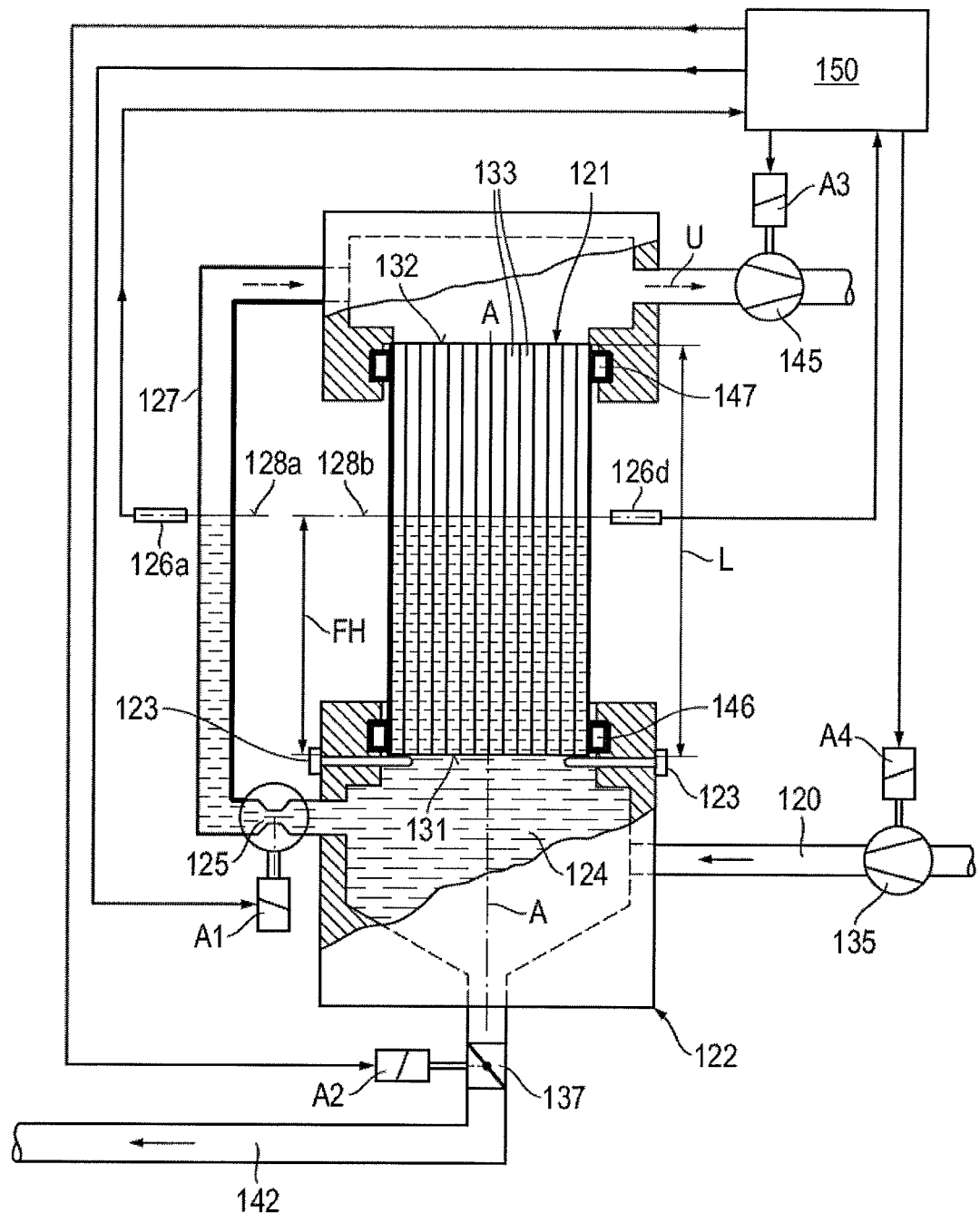

FIG. 2 shows a coating device (122) in a detailed illustration in accordance with detail II-IV FIG. 3 shows an operating option for the coating device (122) shown in FIGS. 1 and 2, FIG. 4 shows another operating option for the coating device (122) shown in FIGS. 1 to 3, and FIG. 5 to FIG. 11 show examples of the method sequences according to the invention in accordance with claims 5 to 11 in the form of block diagrams.

The support body (121), often also referred to as a substrate, is generally a hollow substrate which is composed of metals or ceramics and has at least one inner channel, generally a multiplicity of inner channels (133). The support bodies are generally substantially cylindrical support bodies, which each have a cylinder axis (A), two end faces (131, 132), a circumferential surface (130) and an axial length L and are traversed from the first end face to the second end face by a multiplicity of channels. Such support bodies are often also referred to as honeycomb bodies. In particular, the support bodies can be throughflow honeycomb bodies, or alternatively wall flow filters, which can have a high cell density (number of inner channels per area of cross section) of about 10 $cm^{-2}$ to 250 $cm^{-2}$. The support body can be composed of cordierite, mullite, aluminum titanate, silicon carbide or a metal such as steel or stainless steel, for example. The support body is advantageously a monolithic, cylindrically shaped catalyst support body and is traversed by a multiplicity of flow channels (133) parallel to the cylinder axis (A) for the exhaust gases from internal combustion engines. Such monolithic catalyst support bodies are used on a large scale for the production of automotive exhaust gas catalysts. The cross-sectional shape of the catalyst support bodies depends on the installation requirements on the motor vehicle. Catalyst bodies with a round cross section, an elliptical, an oval or a triangular cross section are widely used. The flow channels generally have a square cross section and are arranged in a narrowly spaced pattern over the entire cross section of the catalyst bodies. The channel or cell density of the flow channels generally varies between 10 and 250 $cm^{-2}$, depending on the application. For exhaust gas purification on motor cars, catalyst support bodies with cell densities of about 62 $cm^{-2}$ are still frequently used nowadays.

If the support body (121) is composed of silicon carbide or a metal such as steel or stainless steel, detecting the filling level is more difficult, and the present invention provides a new procedure for solving this problem. However, this procedure can of course also be used to coat support bodies made of cordierite, mullite or other materials.

The support bodies (121) each have a cylinder axis (A), two end faces (131, 132), a circumferential surface (130) and an axial length L and are traversed from the first end face to the second end face by a multiplicity of channels (133). The support body (121) is coated with a desired quantity of the coating medium (124) by aligning the cylinder axis (A) thereof vertically and introducing the coating medium (124) through at least one of the end faces of the support body (121). For this purpose, the support body (121) is arranged on the coating device (122), advantageously in a liquid-tight manner, it being possible to achieve this by means of at least one seal (146). The seal can be hollow and can be filled with gas or liquid as it is mounted on or inserted into the coating device, and can form a leaktight closure. The leaktightness of the joint can be monitored by means of a pressure or flow sensor.

The coating medium (124) is then introduced into the support body (121) against the force of gravity, as shown in FIGS. 1 to 3, it being possible to achieve this by applying an excess pressure to the coating medium (124), thus bringing about a rise in the filling level (FH) of coating medium (124) in the support body (121). During this process, a certain quantity of coating medium (124) is made available by the delivery pump (135). When the liquid level approaches the first end face (131) of the support body (121), a signal can be transmitted by the sensors (123) to the central computer (150), which, depending on the embodiment of the invention, can emit a cutoff signal for the delivery pump (135) or actuate a valve in order to interrupt further inflow of coating medium. A similar procedure can be achieved by using an excess quantity controlled by a dosimeter (136) to provide the supply of coating medium (124) (FIG. 3).

The coating medium (124) can also be introduced by applying a vacuum to the top of the support body (121). For this purpose, the coating medium (124) is drawn into the support body (121) by pumping or applying a vacuum, by means of a suction fan (145) or a vacuum reservoir for example, as shown in FIG. 4. For this purpose, it is of course necessary for the same vacuum to be applied to the riser tube (127) as well and, in one specific embodiment of the invention, a seal (147) is provided between an extraction hood (148) and the support body (121).

The coating medium (124) is liquid and, for example, a suspension or dispersion for coating exhaust gas filters for motor vehicles ("washcoat") which contains catalytically active components or precursors thereof and inorganic oxides such as aluminum oxide, titanium dioxide, zirconium oxide or a combination thereof, it being possible for the oxides to be doped with silicon or lanthanum, for example. Oxides of vanadium, chromium, manganese, iron, cobalt, copper, zinc, nickel or rare earth metals such as lanthanum, cerium, praseodymium, neodymium, promethium, samarium, europium, gadolinium, terbium, dysprosium, holmium, erbium, thulium, ytterbium or combinations thereof can be used as catalytically active components. Noble metals such as platinum, palladium, gold, rhodium, iridium, osmium, ruthenium and combinations thereof can also be used as catalytically active components. These metals can also be present as alloys with one another or with other metals or as oxides. The metals can also be present as precursors, such as nitrates, sulfites or organyls of said noble metals and mixtures thereof, and, in particular, palladium nitrate, palladium sulfite, platinum nitrate, platinum sulfite or $Pt(NH_3)_4(NO_3)_2$ can be used in the liquid coating medium. By calcination at about 400° C. to about 700° C., the catalytically active component can then be obtained from the precursor. To coat a support body for the production of automotive exhaust gas catalysts, a suspension or dispersion of an inorganic oxide can initially be used for coating, after which, in a subsequent coating step, a suspension or dispersion which contains one or more catalytically active components can be applied. However, it is also possible for the liquid coating medium to contain both these components. The liquid coating medium often has a solids content of between 35 and 52% and a viscosity of between 15 and 300 cps.

During coating in the arrangement of the invention, the support body (121) is arranged on a coating device (122), the liquid-carrying part of which is connected by a valve (125) to a riser tube (127), wherein the valve (125) ensures the same pressure conditions and hence substantially the same rise in the liquid in the riser tube (127) as in the support body, the riser tube (127) thus allowing the filling level (FH) of the coating medium (124) in the support body (121) to be monitored. The invention is particularly advantageous if the filling level (FH) is less than the axial length L of the support body (121). Otherwise, it is also possible for the filling level to be detected as the liquid emerges at the upper end face of the support body and for the coating operation to be ended. The arrangement of the invention allows the filling level (FH) of the coating medium (124) in the support body (121) to be monitored by means of at least one sensor (126) on the riser tube (127).

In one specific embodiment of the invention, additional sensors (123) can be mounted on the coating device (122) in order to ensure a sufficient filling level (FH) of coating medium (124) within the coating device (122) for coating the support body (121). It is possible here to provide sensors (126a, 126b, 126c, 126d) which allow the filling level (128a, 128b) in the riser tube (127) and/or in the support body (121) to be determined and to be compared with one another and with the predetermined filling level (FH) by means of the central computer (150). The central computer (150) can readjust the valve (125) by means of the actuator (A1). In principle, any suitable sensors can be used for sensors (123) and (126), these preferably being selected from the group comprising conductivity sensors, ultrasound sensors, photoelectric barriers, refractive index sensors, capacitive sensors and combinations thereof. For detection of the filling level (FH) in the riser tube (127), the sensor (126a), can be arranged laterally, as is the case, for example, with a photoelectric barrier or a conductivity sensor, which emits a signal to trigger the ending of the coating operation when the liquid front is crossed. If changed levels are detected, the laterally arranged sensor can be rearranged mechanically, i.e. shifted along the riser tube (127), for example. If the sensor, that is to say, for example, an ultrasound sensor (126b), which operates on the principle of echo sounding, is arranged above the riser tube (127), the filling level can be tracked by measurement in the course of the coating operation. In this case, a change in the arrangement of the sensor when there is a change in the desired filling level is not required.

With the device of the invention, a method for completely or partially coating support bodies (121) with liquid coating medium (124) is carried out, the support body or bodies (121) being arranged on a coating device (122), the liquid-carrying part of which is connected by a valve (125) to a riser tube (127). The valve (125) is set (FIG. 1), in one specific embodiment of the invention to a fixed value, so that the same pressure conditions and hence substantially the same rise in the liquid in the riser tube (127) as in the support body (121) are ensured, the riser tube (127) thus allowing the filling level of the coating medium (124) in the support body (121) to be monitored.

For this purpose, it is possible, for example, for a support body (121) of a type for which calibration of the valve (125) is to be carried out to be arranged on the coating device (122). At the same time, the filling level (FH) in the support body (121) is also checked in order to enable the filling levels (128a and 128b) in the riser tube (127) and the support body (121) to be compared or correlated with one another. For this purpose, the support body (121) can, for example, be provided with a sensor (126d) for determining the filling level (FH) and, in the case of support bodies made of silicon carbide or metal, the sensor (126c) can be arranged above the upper end face of the support body and detect the emergence of the coating medium (124). Depending on whether the filling level (FH) rises more quickly in the support body (121) or in the riser tube (127), the valve (125) can then be adjusted accordingly in order to adapt the rise in the filling level in the riser tube (127) to the rise in the filling level (FH, 128b) in the support body (121). For this purpose, a number of setting tests may be necessary in order to perform appropriate adjustment of the valve (125). Depending on the properties of the support body (121) and of the coating medium (124), it may be necessary to replace the support body (121) with a new, uncoated support body since, in the case of certain combinations of support bodies and compositions of coating medium, the rise in the filling level within the support body may be altered by previously applied coating medium (124) which is already present. For a particular type of support body, such adjustment of the valve (125) must be carried out for different compositions of the coating medium (124). The data obtained (times, filling levels, compositions and/or viscosities of the coating medium, applied excess pressures or vacuums, types of support body etc.) are entered in tables in a mutually correlated manner. It is particularly advantageous here if, in addition, not only types of support body but also the properties thereof which determine the pressure conditions during coating are likewise entered, e.g. cell densities, lengths, cell sizes, making it possible to perform a rough pre-adjustment of the valve (125) during subsequent valve adjustments involving different coating media and support bodies, on the basis of the known data and the properties of the new types of support body and coating suspensions to be used, and allowing precise adjustment to be performed more quickly. It is particularly advantageous if valve adjustment is performed automatically, e.g. under computer control. In this case, a readjustment is either initiated by an operator or by the central computer (150), or is triggered automatically on the basis of changes in the properties of the coating medium (such as conductivity or viscosity) or a change in the type of support body, it being possible for this to be detected automatically by means of a barcode for example. The valve (125) is then adjusted by means of an actuator (A1), e.g. a servo. The filling levels of the support body (121) and the riser tube (127) are determined with the aid of the sensors and those required to achieve predetermined filling levels are compared by the central computer (150), in which case the computer then performs the adjustment of the valve (125) and, if required, of previously determined values entered in tables by means of an actuator (A1) and, if appropriate, repeats the adjustment until a predetermined accuracy is achieved. After the adjustment of the valve (125), the support bodies (121) can be coated with a desired quantity of the coating medium (124) by aligning the cylinder axis (A) of the support body (121) vertically and introducing the coating medium (124) into the channels (133) through at least one of the end faces (131, 132) of the support body. As described above, this can be accomplished in various ways, such as pumping, the application of an excess pressure or the application of a vacuum. If a vacuum is applied, this must likewise be applied to the riser tube. During the coating of an individual support body (121), the rise in the filling level (FH) is monitored at the riser tube (127) and, when a desired filling level has been achieved, a further rise in the liquid is prevented. A further rise in the liquid is prevented by stopping the inward-pumping operation or reducing the excess pressure or vacuum in relation to ambient pressure. This generally brings about removal of the coating medium (124) from the support body (121), this being accomplished, in particular, by pumping, suction or blowing. If, namely, as in EP-A1-941763 for example, the coating medium (124) is brought about by applying a vacuum to the coating device (122), e.g. via the feed line (120), the surrounding normal pressure causes a flow of gas through the channels of the support body (121), which not only removes the coating medium filling the channels but can also be used to remove any excess quantity of coating medium (124) that may be adhering to the side walls of the channels within the support body (121).

To remove the coating medium (124), a vacuum can be applied to the lower end faces (131), via an outlet line (140) for example, e.g. by opening an extraction valve (137) leading to an evacuated vacuum reservoir (141) (FIG. 1). At the same time, air or some other gas which is inert with respect to the coated support body and the coating suspension, such as nitrogen, can be supplied from the upper end faces (132) of the support body to the upper end faces without being pressurized. Since the pressure in the vacuum reservoir falls, there is therefore also a reduction in the flow rate of the gas in the channels of the support bodies. A procedure of this kind is described in EP-A1-941763, page 4, line 56 to page 5, line 36, for example, to which reference is made.

However, the procedure can also be reversed and the vacuum applied to the upper end faces and gas supplied to the lower end faces of the support bodies. It is likewise also possible for this supply to be changed or reversed one or more times, bringing about more uniform coating of the channels in the support bodies according to U.S. Pat. No. B 7,094,728.

Instead of applying a vacuum ("emptying or freeing the support bodies by suction"), it is also possible to apply an excess pressure ("blowing out" the support bodies). For this purpose, air or some other gas which is inert with respect to the coated support bodies and the coating suspension, such as nitrogen, is supplied to the upper or lower end face under pressure. During this process, the end faces which lie opposite the end faces subjected to gas pressure must ensure that a sufficient quantity of gas can flow off. For this purpose, a vacuum can be applied, but this is not absolutely essential. However, a gas or liquid pressure should not also be applied from the opposite sides to ensure a gas flow rate sufficient to remove excess coating suspension from the channels of the support bodies. In this case too, as in the method according to U.S. Pat. No. B 7,094,728 outlined in brief above, the excess pressure can be supplied alternately from the upper and lower end faces.

The coating operation of the invention can also be repeated, either to bring about complete coating of the support bodies by means of two partial coating steps or, alternatively, to apply different coatings one on top of the other or to different sections of the support body. These procedures are known in principle in the prior art. Depending on the procedure, the coating medium (124) used upon repetition of the coating operation can therefore be the same as or different from the coating medium in a preceding coating operation.

Before a repetition of the coating operation, the support body (121) can advantageously be turned through 180° and then coated, with the result that coating starts from the opposite end face (132) of the support body (121) from the end face (131) from which coating started in the preceding coating operation.

After removal of the coating medium (124), the support bodies (121) are, if appropriate, dried and subjected to a heat treatment (calcined). Before the heat treatment, the support bodies can be dried. This measure is optional since the support bodies are dried in any case during the subsequent heat treatment.

For drying, a flow of preheated air at a temperature of between 20 and 150° C. flowing at a rate of more than 4, preferably 7-10 m/s, for 5 to 20 s can be passed through the channels (133) of the support body (121), from below against the force of gravity for example, after removal from the coating device. By means of this type of pre-drying before heat treatment, clogging of the flow channels or narrowing of the channels at the lower end of the support bodies, which is often observed at very high rates of charge, can be avoided. This additional measure makes it possible to charge the support body with a higher quantity of coating than normal without the flow channels closing up or narrowing during the drying and calcination process. The concentration of the coating dispersion on the support body can thus be increased by this measure.

The heat treatment is generally carried out at a temperature of about 150° C. to about 800° C., in particular at about 200° C. to 700° C., advantageously at about 250° C. to about 600° C. The time for heat treatment is about 1 to 5, advantageously 2 to 3 hours at a heating rate of about 10° C./min to about 50° C./min, in particular about 20° C./min to about 40° C./min, advantageously about 35° C./min to about 45° C./min, the heating rates relating to the temperature of the furnace. In the case of batchwise heat treatment, the heating rates can be achieved by appropriate controlled heating of the furnace or, in a continuous process, by controlling the feed rate of the support bodies through a tunnel furnace, which is operated with a defined temperature profile.

In one specific embodiment of the method of the invention, the support body is wetted before being arranged on the coating device. In the dry state, the support bodies have a considerable absorption capacity for liquids. Particularly when coating highly cellular support bodies with cell densities of 120 $cm^{-2}$ and above, this can lead to solidification of the coating medium and blockage of the flow channels even during the filling process. It is therefore advantageous to wet the support bodies before coating. This can be a matter of pre-impregnation with an acid, a base or a salt solution. Pre-impregnation facilitates the formation of the coating on the channel walls by the sol-gel method. Contact between the coating dispersion and the pre-impregnated channel walls shifts the pH of the dispersion, a suitable dispersion used as a coating medium thereby being converted into a gel.

The present invention also relates to a method for producing exhaust systems containing coated support bodies (121), wherein at least one support body (121) is coated by the method of the invention and at least one support body (121) coated in this way is connected to the exhaust system, i.e. the coated support body is inserted or installed in the exhaust system in such a way that the stream of exhaust gas flows through the fully coated support body and the pollutant content of the exhaust gases is reduced. The exhaust system is, in particular, an exhaust system of a motor vehicle. The device of the invention can therefore be used to produce coated support bodies for cleaning exhaust gases.

LIST OF REFERENCE SIGNS 120 feed line for coating medium 124
121 support body
122 coating device 123 sensors for the level in 122
124 coating medium
125 valve at the riser tube inlet
126a,b sensors for liquid level in the riser tube 127
126c,d sensors for liquid level in the support body 121
127 riser tube
128a filling level in the riser tube 127
128b filling level in the support body 121
130 circumferential surface of the support body 121
131 first end face of the support body 121
132 second end face of the support body 121
133 channels in the support body 121
135 delivery pump for coating medium 124
136 dosimeter
137 extraction valve
140 outlet line from 122 for coating medium 124
141 vacuum reservoir
142 return line for coating medium 124
143 recirculation pump
144 tank for coating medium
145 suction fan for coating medium (FIG. 4)
146 bottom seal
147 top seal
148 extraction hood
150 central computer
201 method feature: arrangement of 121 in 122 via valve 125 with riser tube 127
202 method feature: setting of valve 125
203 method feature: partial coating of the support body
204 method feature: monitoring of the filling level 128
205 method feature: prevention of rise
210 method feature: prevention by removal of 124
211 method feature: prevention by pumping off
212 method feature: repetition of coating
213 method feature: turning of the support body and repetition of coating
215 method feature: repetition of coating with a different coating medium
216 method feature: heat treatment
A cylinder axis
A1 activator for valve 125
A2 activator for extraction valve 137
A3 activator for extraction fan 145
A4 activator for delivery pump 135
D diameter of support body 121
L length of support body 121
FH filling level of the support body 121

The invention claimed is:

1. An arrangement for completely or partially coating a support body with a coating medium, the support body having a longitudinal axis (A), two end faces, an axial length (L), and a multiplicity of channels extending from the first end face to the second end face, the arrangement comprising:
 a coating device for receiving the support body, the coating device having a coating-medium-carrying part connected by a valve to a riser tube; and
 a control unit for storing support body data and coating medium data, the control unit communicating with the valve for adjusting an opening value of the valve, wherein
 the arrangement is operable to coat the support body with a desired quantity of the coating medium by aligning the longitudinal axis (A) of the support body vertically and introducing the coating medium into the channels through at least one of the first and second end faces, and
 the control unit is configured to adjust the opening value of the valve based on stored support body data and stored coating medium data to ensure substantially the same pressure conditions and substantially the same rise in the coating medium in the riser tube as in the support body, with the riser tube configured to monitor a filling level (FH) of the coating medium in the support body.

2. The arrangement as claimed 1, wherein the coating device is operable to coat the support body to a predetermined filling level (FH) that is less than the axial length (L) of the support body.

3. The arrangement as claimed in claim 1, wherein the riser tube comprises at least one sensor that is configured to monitor the filling level (FH) of the coating medium in the support body.

4. The arrangement as claimed in claim 3, wherein the at least one sensor is a conductivity sensor; an ultrasound sensor; a photoelectric barrier; or a combination thereof.

5. An arrangement for coating a support body with a coating medium, comprising
 a coating device for receiving a support body having two end faces and multiplicity of channels extending from the first end face to the second end face, the coating device having a coating-medium-carrying part that is connected by a valve to a riser tube; and
 a control unit for storing coating process data, the control unit communicating with the valve for adjusting an opening value of the valve, wherein
 the control unit is configured to adjust the opening value of the valve based on stored coating process data to ensure corresponding pressure conditions and a corresponding rise in the coating medium in the riser tube as in the support body, with the riser tube configured to monitor a filling level (FH) of the coating medium in the support body.

6. The arrangement as claimed in claim 5, wherein the coating device is operable to coat the support to a predetermined filling level (FH) that is less than the axial length (L) of the support body.

7. The arrangement as claimed in claim 5, wherein the riser tube comprises at least one sensor that is configured to monitor the filling level (FH) of the coating medium in the support body.

8. The arrangement as claimed in claim 7, wherein the at least one sensor is a conductivity sensor; an ultrasound sensor; a photoelectric barrier; or a combination thereof.

9. The arrangement as claimed in claim 5, wherein the control unit is configured to adjust the opening value of the valve to ensure substantially the same pressure conditions in the riser tube as in the support body.

10. The arrangement as claimed in claim 5, wherein the control unit is configured to adjust the opening value of the valve to ensure substantially the same rise in the riser tube as in the support body.

11. The arrangement as claimed in claim 5, wherein the control unit is configured to adjust the opening value of the valve on the basis of at least one property selected from the group of: composition of the coating medium; viscosity of the coating medium; cell density of the support body; length of the support body; and cell size of the support body.

12. A method for producing a coated support body for cleaning exhaust gases comprising
 coating a support body utilizing an arrangement for completely or partially coating a support body with a coating medium, the support body having a longitude axis (A), two end faces, an axial length (L), and a multiplicity of channels extending from the first end face to the second end face, the arrangement comprising:

a coating device for receiving the support body, the coating device having a coating-medium-carrying part connected by a valve to a riser tube; and a control unit for storing support body data and coating medium data, the control unit communicating with the valve for adjusting an opening value of the valve, wherein the arrangement is operable to coat the support body with a desired quantity of the coating medium by aligning the longitudinal axis (A) of the support body vertically and introducing the coating medium into the channels through at least one of the first and second end faces, and the control unit is configured to adjust the opening value of the valve based on stored support body data and stored coating medium data to ensure substantially the same pressure conditions and substantially the same rise in the coating medium in the riser tube as in the support body, with the riser tube configured to monitor a filling level (FH) of the coating medium in the support body.

13. The method as claimed in claim 12 further comprising:

performing a coating operation, comprising monitoring a rise in the filling level (FH) at the riser tube and, when a predetermined filling level (FH) is achieved, preventing a further rise in the filling level (FH).

14. The method as claimed in claim 13, wherein the coating operation is repeated.

15. The method as claimed in claim 14, wherein the coating medium of the repeated coating operation is the same as or different from the coating medium in the preceding coating operation.

16. The method as claimed in claim 14, wherein the support body is turned 180° before the coating operation is repeated, such that the coating medium of the repeated coating operation is introduced from the opposite end face of the support body as compared to the end face through which the coating medium was introduced in the preceding coating operation.

* * * * *